United States Patent [19]
Munz

[11] 3,895,293
[45] July 15, 1975

[54] METHOD AND SYSTEM FOR FURNISHING AN INDICATION OF THE DEVIATION OF THE ACTUAL FREQUENCY OF A LOW FREQUENCY SIGNAL FROM A NOMINAL FREQUENCY

[75] Inventor: Siegfried Munz, Pforzheim, Germany

[73] Assignee: Elma, Hans Schmidbauer, Singen am Hohentwiel, Germany

[22] Filed: Mar. 4, 1974

[21] Appl. No.: 447,517

[30] Foreign Application Priority Data
July 14, 1973 Germany............................ 2335847

[52] U.S. Cl.................... 324/78 Z; 73/6; 307/233; 324/79 D; 324/83 R; 324/186
[51] Int. Cl........................................... G01r 23/02
[58] Field of Search..... 324/78 R, 78 D, 78 J, 78 E, 324/78 Q, 78 Z, 79 R, 79 D, 82, 186, 188, 189, 190, 191, 83 R, 83 A, 85; 307/232–234; 328/109, 110, 112, 138, 139; 73/6

[56] References Cited
UNITED STATES PATENTS
3,241,063  6/1966  Beattie................................ 324/186
3,777,547  12/1973  Izami.................................. 324/186

Primary Examiner—Stanley T. Krawczewicz
Attorney, Agent, or Firm—Hans Berman

[57] ABSTRACT

A high-frequency oscillator furnishes a high-frequency signal which is applied to the counting inputs of two counters each of which counts by frequency division. The pulse sequence derived from a determined corresponding stage in each of the two counters constitutes a first and second counting signal. The counters are reset alternately at predetermined instants in the cycle of the low-frequency signal. A phase shift is thus created between the first and second counting signal. A logic circuit connected to receive the first and second counting signals furnishing a third pulse sequence having a frequency corresponding to the frequency of the first and second counting signals and having a pulse width which corresponds to the deviation of the actual frequency of the test signal from the nominal frequency.

18 Claims, 9 Drawing Figures

Fig. 7 ly, at determined time instants in the cycles of the test signal, thereby creating a phase shaft between said first and second pulse sequences. Finally, logic circuit means are provided having a first and second input connected to

METHOD AND SYSTEM FOR FURNISHING AN INDICATION OF THE DEVIATION OF THE ACTUAL FREQUENCY OF A LOW FREQUENCY SIGNAL FROM A NOMINAL FREQUENCY

BACKGROUND OF THE INVENTION

The present invention relates to a method and system for furnishing an error signal indicative of the deviation of the actual frequency of a low-frequency test signal from a nominal frequency. In particular, the present invention relates to such a system wherein the error signal is indicative of the fast or slow running of high quality time pieces.

Methods and systems are known wherein the deviation of the frequency of a low-frequency signal and, more particularly, a low-frequency pulse sequence from a nominal frequence is determined by measuring the time interval between two sequential pulses of the low-frequency pulse sequence by counting the number of oscillations of a high-frequency oscillator occurring between these sequential pulses and then furnishing a visual indication, generally in digital form.

In another known method, the frequency deviation is indicated by a measuring instrument which is energized by an integration signal derived from integration of the low-frequency pulse sequence. Alternatively, a so-derived integration signal can first be compared to a reference signal which is derived from a saw tooth curve controlled by a signal having the nominal frequency. This method is limited in the region of small frequency deviations and for low frequencies of the low-frequency test signals by the required integration time.

In another known method and arrangement, the number of cycles of the low-frequency test signal, and in particular the number of ticks of a clock, are counted in one counter, while the high-frequency signal is counted in another counter which is started with the first clock tick and stopped by the last counted tick of the clock. This method has the disadvantages that not only must the capacity of the measuring counter vary as a function of the number of clock beats per second, but also the final indication on the counters is the error, for example, in milliseconds per clock beat rather than in milliseconds per second.

SUMMARY OF THE INVENTION

It is an object of the present invention to furnish a method and system for furnishing an error signal corresponding to the difference between the actual frequency of a test signal and its nominal frequency. The invention comprises high-frequency oscillator means furnishing a high-frequency signal. It further comprises first and second counting means each having a counting input connected to said high-frequency oscillator means and each further having a reset input, for counting the number of cycles of said high-frequency signal and furnishing, respectively, a first and second pulse sequence having the same frequency. Test circuit means are furnished which have an input for receiving the test signal and an output connected to the reset inputs of the first and second counting means, for resetting said first and second counting means alternately at determined time instants in the cycles of the test signal, thereby creating a phase shaft between said first and second pulse sequences. Finally, logic circuit means are provided having a first and second input connected to receive said first and second pulse sequences respectively, for furnishing a third pulse sequence having a frequency corresponding to said frequency of said first and second pulse sequence, the pulses in said third pulse sequence having a pulse width corresponding to said phase shift between said first and second pulse sequence. This third pulse sequence constitutes said error signal.

In a preferred embodiment of the present invention, the third pulse sequence is applied to a measuring instrument whose inertia results in an integration, thereby causing the indication on the instrument to vary as a function of the phase difference between the first and second pulse sequences.

In a preferred embodiment of the presnt invention, the frequency of the first and second pulse sequences and therefore the frequency of the third sequence is chosen to be a harmonic of the nominal frequency of the test signal. Under these circumstances, a zero phase shift between the first and second pulse sequences corresponds to a zero deviation of the actual frequency from the nominal frequency of the test signal.

In the above-described arrangement, the deflection on the measuring instrument varies as a function of the phase difference between the first and second pulse sequence, but is independent of the direction of the phase difference, that is whether the actual frequency of the test signal exceeds or is less than the nominal frequency. Therefore, in a further preferred embodiment of the present invention, the logic circuit means is divided into a first and second logic circuit, the first of which furnishes the error signal only if the actual frequency of the test signal exceeds the desired nominal frequency, while the second furnishes the error signal only when the actual frequency is less than the nominal frequency.

The first and second logic circuit means utilize inputs from a bistable circuit which controls the alternate resetting of the first and second counting means in response to the test signal.

The first and second logic circuit outputs are connected to opposite terminals of a measuring instrument which has a mechanically centered zero and which deflects in one or the other direction depending upon whether the first or the second logic means are furnishing the error signal. It should be noted that the first and second counting signals are, respectively, a first and second pulse sequence derived from corresponding selected stages in the first and second counting means. In order to achieve the presently discussed polarity sensitive deflection, the logic circuit means have inputs not only to the selected counting stage but also to the immediately previous counting stage in each of the first and second counting means. Further, one input of the logic circuits is the bistable circuit which controls the resetting of the first and second counting means in response to the test signal.

The indication resulting from the above-mentioned embodiment of the present invention still varies as a function of the nominal frequency of the test signal, that is, the indication will be of the frequency deviation from the nominal frequency per cycle of the test frequency rather than per a standard time interval. In a further preferred embodiment of the present invention, the test circuit means, that is the circuit means which receive the test signal and in response thereto reset the first and second counting means, include a circuit for normalizing the frequency of the test signal to a standard time interval. The indication furnished by a circuit utilizing the normalizing circuit can then be calibrated directly in deviation per unit time. In a particularly preferred embodiment of the present invention, synchronizing means are also provided to synchronize the normalized test signal relative to the test signal.

The features of the present invention which are believed to be novel as set forth with particularity in the appended claims. The method and system of the present invention, including the constructions and operation of the latter, together with further objects and advantages thereof, may best be understood by reference to the following description taken in connection with the accompanying drawing in which:

DESCRIPTION OF THE PREFERRED EMBODIMENT

A preferred embodiment of the present invention will now be described with reference to the drawing.

Figure 1:
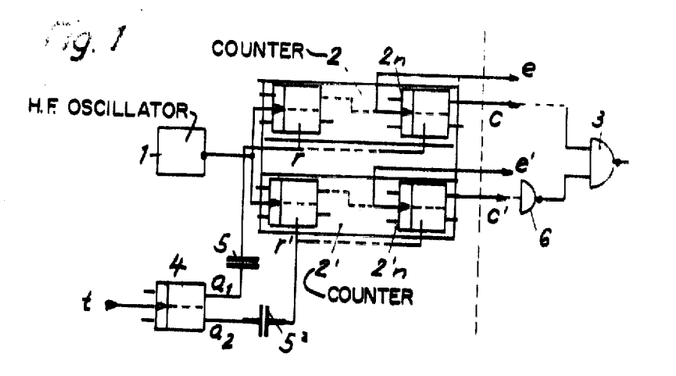
FIG. 1 shows a circuit of the present invention in block diagram form.

In FIG. 1, 1 represents a high-frequency oscillator whose output frequency in a preferred embodiment of the present invention is 1.44 MHz. The output of high-frequency oscillator 1 is connected to the counting inputs of a counter 2 and a counter 2'. Counters 2, 2' are identical counters but operate independently of each other except for the fact that they receive the same input at the counting inputs. Both counters are standard units utilizing a plurality of bistable stages connected in cascade and operate by sequential frequency division, that is, each stage has at its output a square wave signal whose frequency is twice the frequency of the next following stage. Outputs $c$, $c'$ are selected from corresponding stages $2n$, $2n'$ of counters 2, 2' and furnish an output signal which is a square wave having a frequency of approximately 1000 Hz. The signal $c$ derived from counter 2 is applied directly to the first input of a NAND gate 3 while the signal $c'$ is applied to the second input of this NAND gate through an inverter 6. NAND gate 3 is a standard NAND gate furnishing a high output when either or both of the signals at the two inputs are low, and a low output when both of the input signals are high. "High" and "low" in this application are the equivalents of the logic "One" and logic "Zero" states respectively.

Further shown in FIG. 1 is a bistable stage, here shown as a flip-flop 4 having outputs $Q_2$ and $Q_1$. The trigger input to flip-flop 4 is connected to receive the slow pulse sequence whose deviation from a nominal frequency is to be indicated. While the circuit of the present invention of course finds application for indicating the deviation from the normal frequency of any type of low-frequency signal, one of its intended uses is for the timing of a clock. The signal at the trigger input of flip-flop 4 may thus be a pulse derived after suitable pulse shaping in known manner from the tick or beat of a clock. Outputs $Q_2$ and $Q_1$ of flip-flop 4 are connected through a differentiating circuit, which is a standard RC differentiating circuit and is indicated schematically by capacitors 5, 5' in FIG. 1 to the reset inputs $r$, $r'$ respectively of counters 2, 2'. Counter 2 will thus be reset when signal $Q_2$ changes from a "One" to a "Zero" output while counter 2' is similarly reset when the same change occurs in output $Q_1$. Resetting of the counters is accomplished in a negligible time interval, so that the resetting is equivalent to an instantaneous setting of all stages of a counter to a "Zero" state.

The above-described arrangement operates as follows:

First let it be assumed that no signal is applied to the trigger input of flip-flop 4. Under these conditions, the output of high-frequency oscillator 1 is continually applied to both counters 2, 2' and the resultant output at counter stages $2n$, $2'n$ is a square wave such as is shown in lines $c$, $c'$ of FIG. 2a. Since both counters are energized simultaneously from the same source, the two square waves will be in phase. Under these conditions, the output of NAND gate 3 will be a constant "One" since the signal $\bar{c'}$ is of course always out of phase with the signal $c$. This steady output is shown in line $c.\bar{c'}$ of FIG. 2a.

Figure 2A:
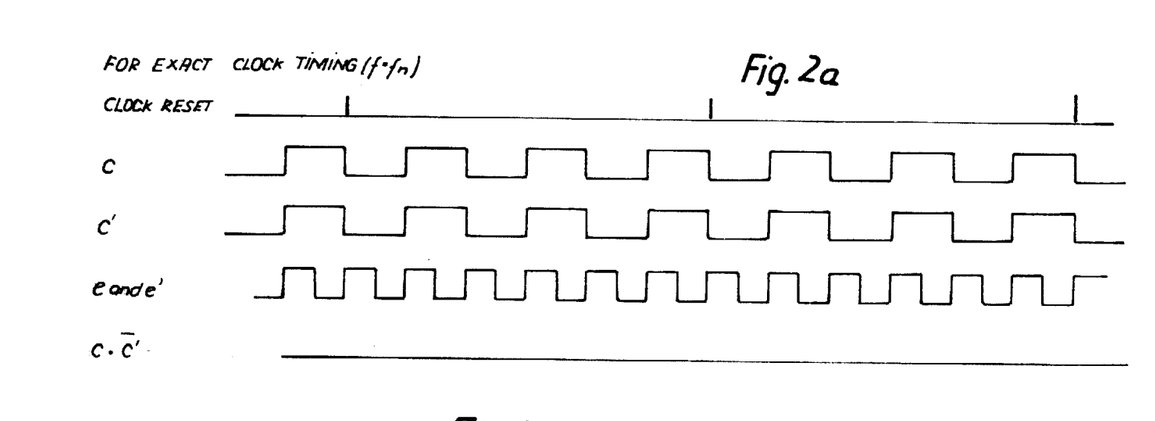
FIGS. 2a – 2c show the wave forms at different points of the circuits of FIGS. 1 and 3 for, respectively, test signals having a frequency equal to, greater than, and less than the nominal frequency.

Let it now be assumed that a signal is applied to the trigger input of flip-flop 4. Under these conditions, counter 2 and counter 2' are reset alternately, each once for every two cycles of the incoming test signal. It should be noted that the signal applied to the trigger input of flip-flop 4, the test signal, is not synchronized to high-frequency oscillator 1. Thus, the first trigger signal can of course reset one of the counters, for example counter 2', at an arbitrary time in that counter's cycle. Upon receipt of the reset signal, signal $c'$ will immediately drop to "Zero" and will not rise again until a time period corresponding to one half of its cycle (indicated by T/2 in FIG. 2a) has elapsed. This, of course, will cause the pulse sequence $c$ to be out of phase with the pulse sequence $c'$. At the next trigger signal input to flip-flop 4, the second counter, for example counter 2, is reset. Again this may occur during a "One" output at stage $2n$ causing the "One" output to drop immediately and not return to a "One" until time period T/2 has again elapsed. Meanwhile of course the output $c'$ of counter 2' is unaffected by the second reset signal. The third reset signal will then again be applied to counter 2' resetting the output at $2'n$. Following receipt of the first two reset signals, the number stored in each counter at the time of reset at the other counter corresponds to the time elapsed since the last reset pulse, that is, the time interval between successive cycles of the test signal. A steady-state condition has then been achieved and the phase difference between the two counters will be indicative of this difference. For the conditions shown in FIG. 2a, the frequency at counter output $2n$ and $2'n$ is a multiple of the nominal frequency of the test signal. Under this condition with the test signal at the nominal frequency, a zero phase shift between signals $c$ and $c'$ will result. This is the condition under which the preferred embodiment of the present invention operates, that is, a zero frequency deviation is indicated by a constant "One" output of NAND gate 3. FIG. 2a shows wave forms $c$, $c'$, as well as waveforms $e$ and $e'$ which will be discussed in conjunction with FIG. 3, and the output of NAND gate 3 is indicated in lines $c.\overline{c'}$ under steady-state conditions, that is, when the transient period following the first application of the test signal to flip-flop 4 has died down.

Figure 2B:
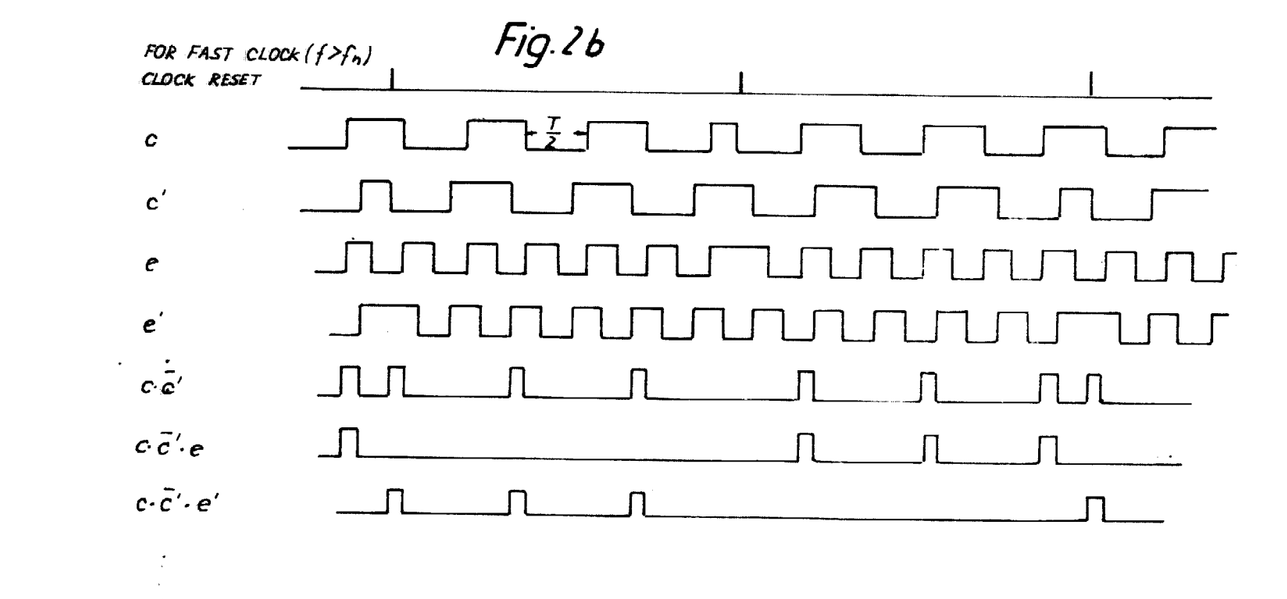

FIG. 2b shows the wave forms when the frequency of the test signals exceeds the nominal frequency. Here the first reset pulse is applied to counter 2' causing signal $c'$ to change instantaneously to "Zero" and thereafter not to return to the "One" state until after the time interval T/2. The signal $c$ at counter output $2n$ is of course unaffected by this first reset signal. The second reset signal resets counter 2, causing signal $c$ to drop to zero as described with relation to signal $c'$. It will be seen that under these conditions a phase shift results between signals $c$ and $c'$. Thus, the output pulses of line $c.\overline{c'}$ result. Each pulse in this line is derived from a circuit condition wherein there is a signal $c$, but no signal $c'$. The output of NAND gate 3 would be the pulse sequence shown in line $c.\overline{c'}$, but with reversed polarity. It is to be noted that the pulse frequency (repetition rate) shown in line $c.\overline{c'}$ is a function of the frequency of the signal in lines $c$ and $c'$, while the pulse width varies as a function of the phase difference between lines $c$ and $c'$. It should further be noted that the frequency in lines $c$ and $c'$ is substantially higher than the reset frequency shown in the line "clock reset", that is, the frequency of the test signal. Under this condition, a very large number of pulses occurs at the output of counters 2 and 2' between sequential reset pulses. For purposes of clarity, only a few of these are shown. Because of this high frequency, the signal at the output of NAND gate 3 can be applied directly to a measuring instrument whose inertia will cause an integrating effect whereby the deflection of the instrument will be a function of the phase difference between the signals of line $c$ and $c'$.

Figure 2C:
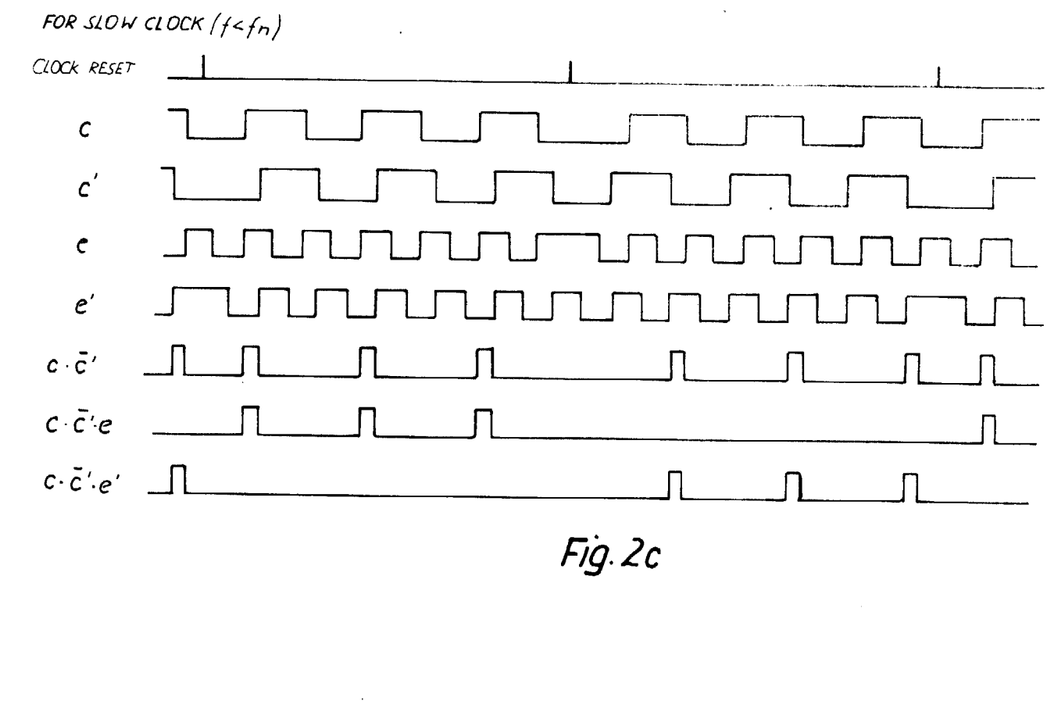

FIG. 2c shows the conditions at the same circuit points as FIGS. 2a and 2b, but when the frequency of the test signal is less than the nominal frequency. It will be noted that conditions were so chosen that the frequency is less than the nominal frequency by the same amount that the frequency of FIG. 2b exceeded the nominal frequency. Under these conditions, it will be seen that the signal in line $c.\overline{c'}$ is, for indication on the measuring instrument, identical with that under the higher frequency conditions shown in FIG. 2b. Thus, the circuit of FIG. 1 without further modification will indicate the magnitude of the phase deviation, that is the magnitude by which the frequency of the test signals exceeds or is less than the nominal frequency, but will not indicate the direction.

Figure 3:
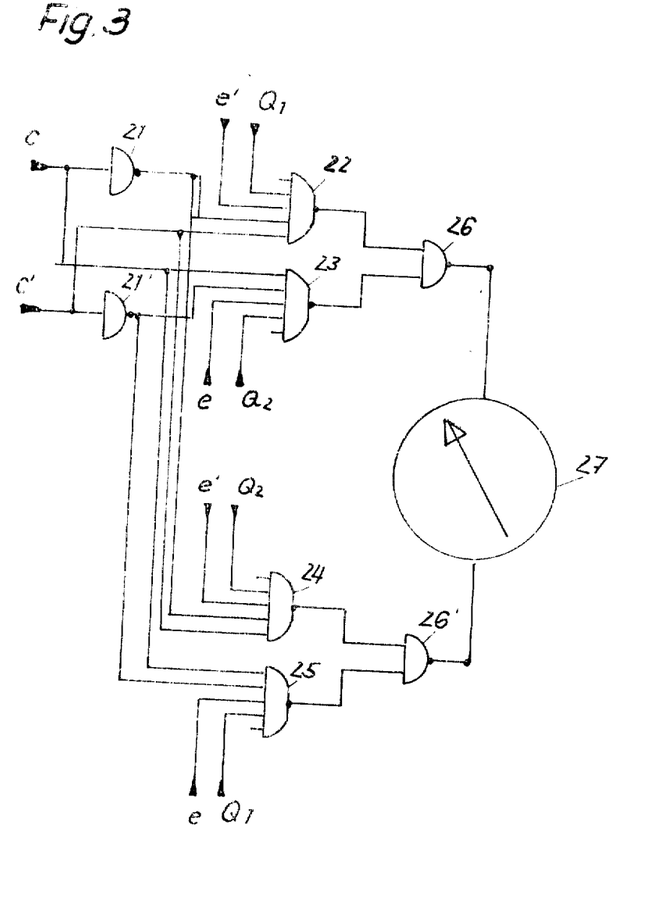
FIG. 3 shows an embodiment of logic circuit means for indicating the direction as well as the magnitude of the frequency deviation of the test signal.

A circuit which allows an indication also of the direction of frequency deviation is shown in FIG. 3. It is seen that the logic circuit which was embodied in inverter 6 and NAND gate 3 in FIG. 1 now comprises a first inverter 21, connected to the $2n$ output of counter 2, a second inverter 21' connected to the $2'n$ output of counter 2', a first, second, third and fourth NAND gate labeled 22, 23, 24, 25, respectively, and summing circuit means, namely additional NAND gates 26 and 26'. NAND gates 22, 23, and 26 constitute the first logic circuit means while NAND gates 24, 25, and 26' constitute the second logic circuit means. Specifically, NAND gate 26 has a first and second input respectively connected to the outputs of NAND gates 22 and 23, while NAND gate 26' has a first and second input respectively connected to the output of NAND gates 24 and 25. NAND gate 22, as well as NAND gate 24, has a first input directly receiving the signal from terminal $c'$, a second input receiving $\overline{c}$, that is signal $c$ after inversion by inverter 21, a third input labeled $e'$, and a fourth input labeled $Q_1$ for NAND gate 22 and $Q_2$ for NAND gate 24.

NAND gates 23 and 25 each have a first input connected directly to the $2n$ output of counter 2, a second input connected to the $2'n$ output of counter 2' through inverter 21', a third input labeled $e$ and a fourth input which, for NAND gate 23, is labeled $Q_2$ and for NAND gate 25 is labeled $Q_1$. The symbols and functioning of the circuit of FIG. 3 will now be explained with reference to FIGS. 2a – 2c and FIG. 1.

First, reference to FIG. 1 shows that the signals $e$ and $e'$ are taken, respectively, from the counters 2, 2' and, more specifically, from the output of the stage preceding stages $2n$ and $2'n$, respectively. As shown in FIGS. 2a – 2c and as is particularly clear with reference to FIGS. 2b and 2c, signals $e$ and $e'$ are, respectively, in phase with signals $c$ and $c'$, but have twice the frequency of these signals. It will be noted that the $e$ and $e'$ signals are derived from the zero side of the stages preceding stages $2n$ and $2'n$ respectively. Therefor, stages $2n$ and $2'n$ are triggered when signals $e$ and $e'$, respectively, switch from high to low. Also, upon receipt of a reset signal, signals $e$ and $e'$ will switch to high level if previously low, or an existing high level will be maintained. Thus reference to FIG. 2b shows that the first reset signal causes signal $c'$ to reset, that is, to switch to the lower level, while signal $e'$, which is resest simultaneously with signal $c'$, remains high.

The lines labeled $c.\overline{c'}.e$ in FIGS. 2b and 2c should now be compared. It should be kept in mind that FIG. 2b represents the conditions when the test signal frequency is higher than the nominal frequency, while FIG. 2c represents the same wave forms under conditions of a reset pulse which occurs at frequencies greater than the nominal frequency. It will be noted that over a period of two cycles of the low frequency signal, that is a period including two reset pulses, the total outputs under both the high pulse and low pulse rate conditions are the same. However, when the frequency of the test signal exceeds the nominal frequency (FIG. 2b), there is no output during the first cycle but an output during the second cycle. The reverse condition is obtained when the test signal frequency is less than the nominal frequency. Thus, in order to get an output which occurs only when the test signal frequency is greater than the nominal frequency, a further signal must be applied to the signals which are combined in line $c.\overline{c'}.e$ which samples only the even cycles and not the odd cycles. Such a signal is of course available at the output of flip-flop 4 of FIG. 1. Specifically, the signal $Q_2$ which, when going from a low to a high level, resets counter 2, will, when combined with the signal $c.\overline{c'}.e$ to form $c.\overline{c'}.e.Q_2$ (the inputs to NAND gate 23), yield an output if the frequency of the low-frequency signal is higher than the nominal frequency but will suppress this output when the frequency of the low-frequency signal is less than the nominal frequency (FIG. 2c). Thus, NAND gate 23 will yield an output for a low frequency signal having an excessively high frequency but no output for a low frequency signal having too low a frequency. A similar consideration shows that NAND gate 25 which has the identical inputs as NAND gate 23 (except it is gated by signal $Q_1$ of flip-flop 4 of FIG. 1) will yield an output when the frequency of the low frequency signal is less than the nominal frequency. The outputs of gates 23 and 25, as shown in FIG. 3, are applied to opposite terminals of a measuring instrument which has a mechanical zero center and which deflects in one or the other of two directions depending upon whether the output is derived from NAND gate 23 or NAND gate 25. These NAND gates would in themselves thus be sufficient to furnish the desired error signal indicative of both the magnitude and direction of the frequency deviation of the low frequency signal from the nominal frequency. However, to improve the signal output, thereby making the circuit more sensitive and more accurate, the remaining two NAND gates are furnished which operate on the cycles suppressed by NAND gates 23 and 25 in similar fashion as described with regard to these latter NAND gates. Thus NAND gate 22 will furnish signals in the $Q_1$ phase of flip-flop 4 of FIG. 1 and NAND gate 24 will operate in the $Q_2$ phase of this flip-flop. The outputs of NAND gates 22 and 23 are then summed in NAND gate 26, whereby the output of NAND gate 26 occurs during both halves of the operation of flip-flop 4, that is, at all times if the frequency of the low frequency signal exceeds the nominal frequency. Similarly, NAND gate 26' serves to furnish an output for outputs both from NAND gate 24 and 25, thereby furnishing a pulse sequence both during the $Q_1$ and $Q_2$ phase of flip-flop 4 if the nominal frequency of the low frequency signal is less than the desired frequency.

It should be noted that for the conditions described, the output of NAND gate 26, and 26' will be a "Zero" output, except during those times when the above-mentioned pulse sequences are generated, that is the pulses in the above-mentioned pulse sequences are positive pulses. For purposes of accuracy, it may be desirable that high voltage is applied at both terminals of the measuring instrument 27 when the frequency of the low frequency signal is the nominal frequency, that is under conditions were the meter is to indicate zero. Under these conditions, it might be preferable to replace NAND gates 26, 26' by AND gates. The advantage of the use of NAND gates is of course that the same gate is used throughout since the NAND gate can also be utilized as an inverter.

Figure 4:
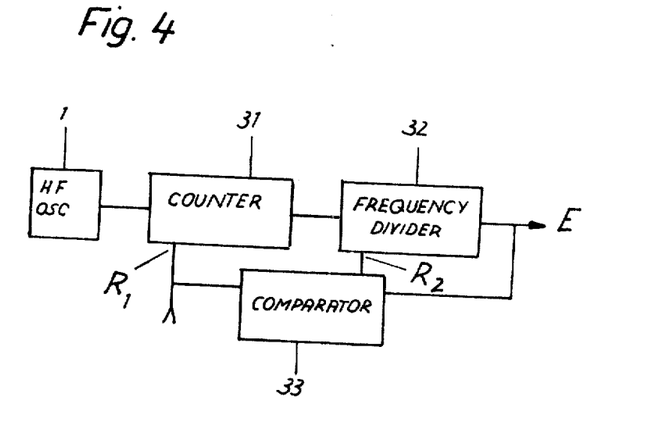
FIG. 4 shows a circuit for converting the test signal to a normalized test signal having a determined frequency, but retaining the phase shift of the test signal.

FIG. 4 shows, in block diagram form, a circuit for normalizing the frequency of the low-frequency signal so that the signal applied at the trigger input of flip-flop 4 will also have the same nominal frequency, even-though the nominal frequency of the actual test signal, namely the signal whose frequency deviation is to be ascertained, is not always the same. For example, in the watch making and testing industry, different types of time pieces have different beat rates, for example, they may beat at one beat per second, two beats per second, four beats per second, five beats per second, eight beats per second, ten beats per second, etc. It is of course desired that the indication on the measuring instrument show the frequency deviation on a normalized basis. For this purpose, FIG. 4 shows the high-frequency oscillator 1 which, as mentioned above, in a preferred embodiment of the present invention furnishes an output frequency of 1.44 MHz. The output of the high-frequency oscillator in addition to being applied to counters 2 and 2' as in FIG. 1 is also applied to a similar counter labeled 31 in FIG. 4. The output of counter 31 can be taken at an arbitrary stage. For example, a frequency of 120 Hz may be chosen since this is a harmonic of the above-mentioned clock beat frequencies. Counter 31 is reset by the test signal, that is, a signal whose frequency deviation from a nominal frequency is to be determined. This resetting can be accomplished by an identical flip-flop to that in FIG. 1 and the corresponding differentiating circuits. This flip-flop is not shown again in FIG. 4.

The signal, a square wave signal, from the selected stage of the counter 31 is applied to a further frequency divider labeled 32 in FIG. 4. This frequency division is carried out without a resetting by the test signal and, in a preferred embodiment of the present invention reduces the frequency to a 1 Hz frequency. Further shown in FIG. 4 is a comparator labeled 33 which serves to synchonrize the output signal from frequency divider 32 to the test signal applied at the reset input of counter 31. The output signal of comparator 33 is applied to the reset input of frequency divider 32.

Figure 6:
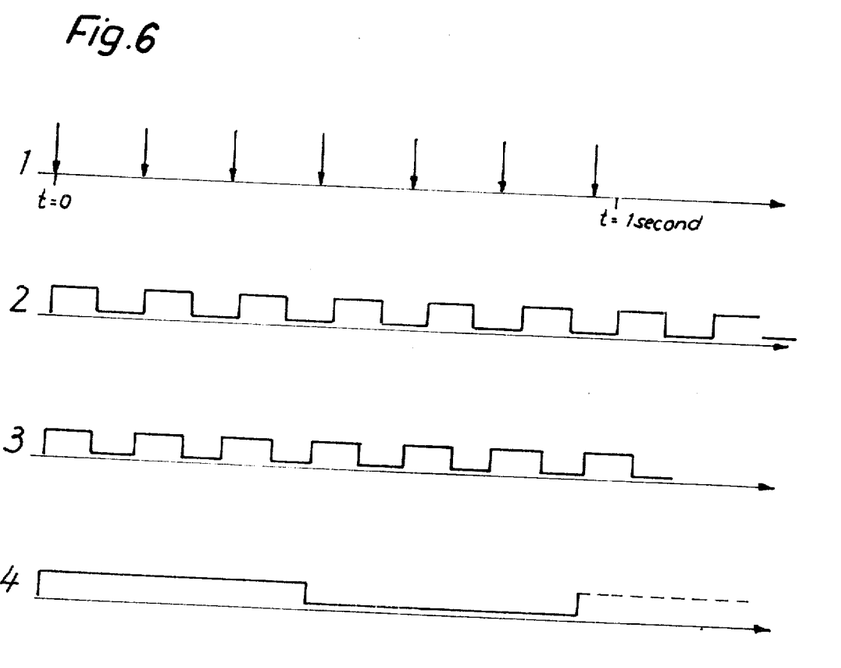
FIG. 6 shows the wave forms generated at particular points of the circuit of FIG. 4.

The operation of this circuit will now be described with reference to FIG. 6. In FIG. 6, the time axis is shown in line 1 where time = 0 and time = 1 sec. are indicated. Line 2 shows the output of counter 31 without the resetting which takes place in accordance with the present invention. It will be seen that an exact number of cycles (six in FIG. 6 for clarity; in the actual circuitry it would be a much higher number, for example 120) are included.

Line 3 shows the output of counter 31 after resetting by a test signal whose frequency exceeds the nominal frequency. Line 4, FIG. 6, shows the output on line E of FIG. 4, namely the output of the further frequency divider 33. It will be noted that its nominal period is one second, but that the period of the actual signal has been shortened by the sum of the errors introduced in each cycle occurring during this period in the signal of line 3. The signal of line 4, namely the signal at the E output of frequency divider 32 of FIG. 4 is the normalized test signal. The normalized test signal is thus a signal whose frequency, insofar as the standard frequency is concerned, is independent of the test signal frequency, but whose frequency deviation corresponds to that of the test signal.

Figure 5:
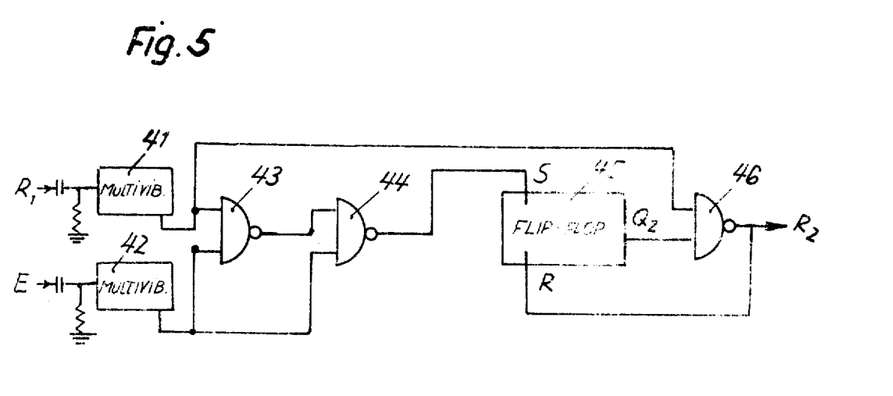
FIG. 5 is a more detailed diagram of the comparator of FIG. 4.

In the above description of the operation of FIG. 4, comparator 33 has not been considered. It is the function of this comparator to bring the output signal of line E into synchronism with the test signal applied on line $R_1$ in FIG. 4. A detailed diagram of this comparator is shown in FIG. 5. In FIG. 5, reference numeral 41 indicates a monostable multi-vibrator which is triggered by one edge of the signal $R_1$ which also triggers counter 31 of FIG. 4. A standard differentiating circuit is shown at the input to multivibrator 41 and also to the input of multivibrator 42. The latter is triggered by one edge of the signal at the output of frequency divider 32, namely the signal on line E. Corresponding outputs of multivibrators 41 and 42 are applied to the first and second input of a NAND gate 43 whose output constitutes one input of a further NAND gate 44. The second input of NAND gate 44 is also connected to the output of multivibrator 42. The output of NAND gate 44 is connected to the SET input of a flip-flop 45 whose reset input, R, is connected to the output of a NAND gate 46. One input of NAND gate 46 is connected to the output of multivibrator 41, while the second input of NAND gate 46 is connected to the $Q_2$ output of flip-flop 45.

The above-described arrangement operates as follows:

NAND gate 33 furnishes a "Zero" output only when the signal from multivibrator 41, which operates in response to a determined edge of the test signal pulse sequence and monostable multivibrator 42 which is set to the unstable state in response to the corresponding edge of the output signal from frequency divider 32, are in coincidence. The signal at the output of NAND gate 44 will thus be a "Zero" only if a "One" exists at the output of NAND gate 43 (i.e., if the signal at the output of frequency divider 32 is not in phase with the test signal) and multivibrator 42 is furnishing a "One" output, that is, indicates the presence of the selected edge of the output of frequency divider 32. The resultant "Zero" signal at the output of NAND gate 44 will cause flip-flop 45 to assume the reset state. In this state, a "One" output exist on line $Q_2$ which forms one input of NAND gate 46. In the presence of a "One" signal on the $Q_2$ line, the output of NAND gate 46 will make a transition from a "One" to a "Zero" state upon arrival of a signal from multivibrator 41. This transition on line $R_2$ will be used to reset frequency divider 32, thereby causing this frequency divider to be in phase with the test signal. It will further be used to set flip-flop 45 back to the set state, so that the circuit is again in the mode in which the signal on line $R_2$ is a "One." This of course blocks any following signals from multivibrator 41, which are now in phase with the signals from multivibrator 42, from line $R_2$.

Figure 7:
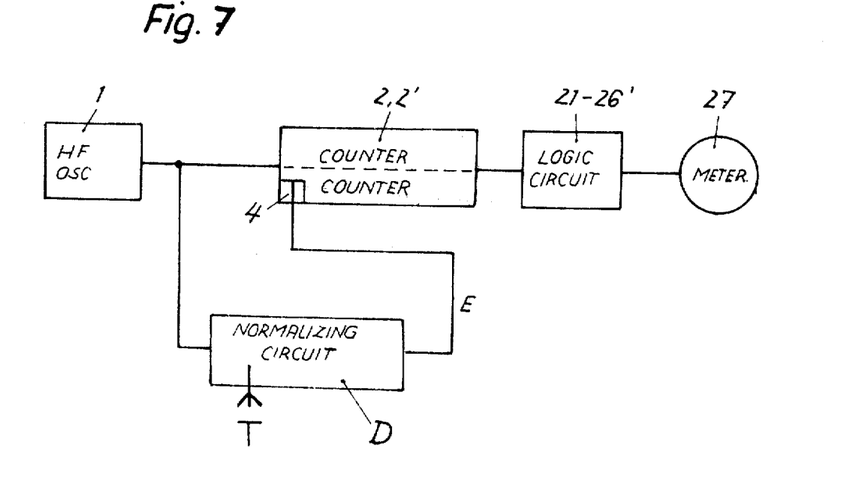
FIG. 7 is a block diagram showing the incorporation of the circuit of FIG. 4 to that of FIG. 1.

FIG. 7 shows, in block diagram form, how the circuits of FIGS. 3 and 4 would be connected to the basic circuit of FIG. 1 to form a particularly preferred embodiment of the present invention. In FIG. 7, the high-frequency oscillator 1 has an output connected both to counters 2 and 2' of FIG. 1 and to a normalizing circuit, that is, the circuit shown in FIG. 4. The output of high-frequency oscillator 1 is thus also connected to the input of counter 31. The output of the normalizing circuit, namely line E, is connected to flip-flop 4 of FIG. 1. The counter outputs, shown schematically as a single line, but of course representing two outputs, are connected to the logic circuit of FIG. 3, that is, specifically, the output of counter 2 would be connected to the input of inverter 21, while the output of counter 2' would be connected to the input of inverter 21'. The output of the logic circuit is shown as terminating in meter 27. It should be mentioned at this point that the output of the logic circuit of FIG. 3 as well as that of FIG. 1, lends itself to a digital indication as well as to an anlog indication. Counting the pulses formed at the output of NAND gate 3 of FIG. 1 on a standard digital counter would result in a count showing the frequency deviation in magnitude but not in direction. Counting pulses at the outputs of NAND gates 26 and 26' separately on two standard digital counters would result in a first count at the output of NAND gate 26 indicating a frequency deviation which indicates that the test signal has a frequency exceeding a nominal frequency, while counting pulses at the output of NAND gate 26' would yield a count showing by how much the frequency of the test signal was less than the nominal frequency.

The components used in the various figures of the present invention are standard integrated circuit building blocks. In a preferred embodiment of the present invention, the counters may comprise TTL building blocks of the 7490 series of the Texas Instrument Company. The monostable multivibrators, in a preferred embodiment of the present invention, are embodied in Texas Instrument series TTL 74121, while NAND GATES used throughout are embodied in TTL series 7400.

It is seen that in accordance with the present invention, a method and a system are taught which yield an analog or digital indication of the frequency deviation of a test signal from a nominal frequency. The logic circuits described herein are of course for preferred embodiments only. NAND gates may of course always be replaced by OR gates or NOR gates in conjunctions with inverters. Such substitution are obvious to one skilled in the art and are not to be excluded from the scope of the present invention.

What is claimed is:

1. Method for furnishing an eror signal indicative of deviation of the actual frequency of a test signal from a nominal frequency, comprising, in combination, steps of furnishing a high-frequency signal having a frequency substantially exceeding said nominal frequency, counting the cycles of said high-frequency signal by sequential frequency divisions in such a manner that a first counting signal is created, said first counting signal comprising a first pulse sequence having a frequency substantially less than said frequency of said high-frequency signal but exceeding said nominal frequency, simultaneously counting said cycles of said high-frequency signal by frequency division in such a manner that a second counting signal is created, said second counting signal comprising a second pulse sequence having a frequency corresponding to the frequency of said first pulse sequence; re-starting said counting to create said first counting signal at predetermined time instants in selected cycles of said test signal, thereby creating phase shift between said first and second pulse sequence; and measuring said phase shift, the so measured phase shift constituting said error signal.

2. A method as set forth in claim 1, wherein said selected cycles of said test signal are alternate cycles, and said counting for creating said second counting signal is re-started at corresponding predetermined time instants of the remaining ones of said cycles of said test signal.

3. A method as set forth in claim 2, wherein said step of measuring said phase difference comprises combining said first and second pulse sequence in such a manner that a resultant pulse sequence is formed, said resultant pulse sequence having a pulse only in the simultaneous presence of a pulse of said first pulse sequence and absence of a pulse of said second pulse sequence.

4. A method as set forth in claim 2, wherein the frequency of said first and second pulse sequence is a determined harmonic of said nominal frequency of said test signal.

5. A method as set forth in claim 2, further comprising the step of counting said cycles of said high-frequency signal, thereby creating a third counting signal corresponding to the number of so counted cycles, said third counting signal comprising a third pulse sequence having a frequency corresponding to the frequency of said first and second pulse sequences; restarting said counting at a predetermined time instant in each cycle of said test signal, thereby creating a phase shifted third counting signal; frequency dividing said phase shifted third counting signal to a predetermined normalizing frequency, thereby creating a normalized signal having said predetermined normalizing frequency and a phase shift corresponding to the phase shift of said phase shifted third counting signal; and wherein said step of restarting said counting to create said first counting signal comprises restarting said counting to create said first and second counting signals, respectively, at predetermined time instants in alternate and remaining cycles of said normalized signal, respectively.

6. A method as set forth in claim 5, further comprising the step of synchronizing said normalized signal to said test signal.

7. Equipment for furnishing an error signal indicative of the deviation of the actual frequency of a test signal from a nominal frequency, comprising, in combination, high-frequency oscillator means for furnishing a high-frequency signal having a frequency substantially exceeding said nominal frequency of said test signal; first and second counting means, each having a counting input connected to said high-frequency oscillator means and a reset input, for counting the cycles of said high-frequency signal and furnishing, respectively, a first and second pulse sequence, each having a frequency substantially less than said frequency of said high-frequency signal but exceeding said nominal frequency; test circuit means having an input for receiving said test signal and an output connected to said reset input of one of said first and second counting means, for resetting said one counting means at time instants corresponding to predetermined time instants in the cycles of said test signal, whereby a phase shift is created between said first and second pulse sequences; and logic circuit means having a first and second input respectively connected to said first and second counting means, and a logic circuit output, for receiving the so phase-shifted first and second pulse sequence and furnishing a third pulse sequence at said logic circuit output in response thereto, said third pulse sequence constituting said error signal.

8. A system as set forth in claim 1, wherein the output of said test circuit means is connected to the reset inputs of said first and second counting means for alternately resetting said first and second counting means, said third pulse sequence having a pulse only in the simultaneous presence of a pulse of said first sequence and the absence of a pulse of said second sequence.

9. A system as set forth in claim 8, wherein said logic circuit means comprises a NAND gate having a first input connected to said first counting means and a second input; and an inverter interconnected between said counting means and said second input of said NAND gate.

10. A system as set forth in claim 8, wherein said test circuit means comprise a bistable circuit having a first and second stable state; control circuit means having an output connected to said bistable circuit and an input for receiving said test signal, for switching said bistable circuit from said first to said second and said second to said first stable state at said predetermined time instants; and connecting means for connecting said bistable circuit to said reset inputs of said first and second counting means in such a manner that said first counting means is reset when said bistable circuit means switches from said first to said second stable state and that said second counting means is reset when said bistable circuit means switches from said second to said first stable state.

11. A system as set forth in claim 10, wherein said connecting means each comprise a differentiation circuit.

12. A system as set forth in claim 10, wherein the pulse width of the pulses of said third pulse sequence varies as a function of said deviation of said frequency of said test signal from said nominal frequency; further comprising a measuring instrument connected to said logic circuit output for furnishing a visual indication of said deviation.

13. A system as set forth in claim 12, wherein said measuring instrument has a centered zero position and a first and second input terminal; and wherein said logic circuit means comprise first logic circuit means having inputs connected to said first and second counting means and a first logic circuit output connected to said first terminal of said measuring instrument, for furnishing said third pulse sequence to said measuring instrument when said frequency of said test signal exceeds said nominal frequency, and second logic circuit means having inputs connected to said first and second counting means and a second logic circuit output connected to said second terminal of said measuring instrument, for furnishing said third pulse sequence to said measuring instrument when said actual frequency at said test signal is less than said nominal frequency, whereby the direction of deflection of said measuring instrument indicates whether said actual frequency of said test signal is less than or greater than said nominal frequency.

14. A system as set forth in claim 13, wherein said first and second counting means respectively have a first and second plurality of binary cascade-connected stages, each of said stages changing state at one half the frequency of the preceding one of said stages; wherein said first and second counting signals are the output of a corresponding selected one of said stages in said first and second counting means respectively; wherein said bistable circuit means has a first and second output terminal for furnishing an output signal when said bistable circuit means is in said first and second state respectively; and wherein said first logic circuit means comprise a first and second inverter respectively connected to the output of said first and second counting means, a first and second NAND gate, each of said NAND gates having four inputs and a NAND gate output, a third NAND gate having a first input connected to the output of said first NAND gate and a second input connected to the output of said second NAND gate, and a NAND gate output connected to said first terminal of said measuring instrument, and connecting means for connecting said four inputs of each of said NAND gates to said first and second inverter, said bistable circuit means and the stages preceding said selected ones of said stages in said first and second counting means in such a manner that said third NAND gate furnishes an output only when said actual frequency of said test signal is less than said nominal frequency.

15. A system as set forth in claim 14, wherein said second logic circuit means comprise a first and second inverter, a first and second NAND gate, each of said NAND gates having four inputs and a NAND gate output, a third NAND gate having a first input connected to the output of said first NAND gate, a second input connected to the output of said second NAND gate and a NAND gate output connected to said second terminal of said measuring instrument, and connecting means for connecting said four inputs of each of said first and second NAND gates to said bistable circuit means, the stages preceding said selected stages in said first and second counting means, and said first and second inverter in such a manner that said NAND gate output of said third NAND gate furnishes a signal to said measuring instrument only when said actual frequency of said test signal exceeds said nominal frequency.

16. A system as set forth in claim 8, wherein said test circuit means comprise high-frequency oscillator means for furnishing a high-frequency signal; first frequency divider means connected to said high-frequency oscillator means and having a reset input connected to receive said test signal, for furnishing a frequency divided signal having a frequency corresponding to the frequency of said high-frequency signal and a phase shift corresponding to said actual frequency of said test signal; and second frequency divider means connected to said first frequency divider means for furnishing a normalized test signal having a frequency independent of, but a phase shift corresponding to, said actual frequency of said test signal.

17. A system as set forth in claim 16, further comprising synchronizing circuit means connected to said second frequency divider means for synchronizing said normalized test signal to said test signal.

18. A system as set forth in claim 17, wherein said synchronizing circuit means comprise comparator means having a first input for receiving said test signal, a second input for receiving said normalized test signal, for resetting said second frequency divider means at a determined instant in the cycle of said test signal when said test signal and said normalized test signal are not in synchronism.

* * * * *